Oct. 16, 1962 W. M. DEAN 3,058,299
FRESH AIR INJECTION FOR COMBUSTION EXHAUST SYSTEMS
Filed June 8, 1961

William M. Dean
INVENTOR.

United States Patent Office
3,058,299
Patented Oct. 16, 1962

3,058,299
FRESH AIR INJECTION FOR COMBUSTION
EXHAUST SYSTEMS
William M. Dean, P.O. Box 636, Tuolumne, Calif.
Filed June 8, 1961, Ser. No. 115,806
4 Claims. (Cl. 60—30)

This invention relates to a novel and useful fresh air injection attachment for the exhaust pipe of a combustion engine and is specifically adapted to inject fresh air under pressure into the exhaust pipe of a combustion engine whereby the unburned fuel particles and carbon particles may be more completely burned.

The fresh air injection attachment is adapted for securement to the exhaust pipe of a combustion engine adjacent the exhaust manifold thereof whereby fresh air injected into the exhaust pipe may be mixed with the exhaust gases in order that the unburned material being exhausted may be more completely burned. The injection of fresh air into an exhaust system enables unburned fuel particles to completely burn before egressing from the exhaust pipe and unburned carbon particles being exhausted are also more completely burned. In this manner, the unburned particles normally exhausted from a combustion engine are greatly reduced and therefore less of these unburned particles are exhausted into the atmosphere and form nuclei for small water droplets which is a major cause of smog.

The main object of this invention is to provide a novel means for reducing the tendency of combustion engine exhaust gases from forming smog.

A further object of this invention, in accordance with the immediately preceding object, is to provide a fresh air injection attachment for the exhaust pipe of a combustion engine which will be capable of introducing fresh air under pressure into the exhaust pipe of the combustion engine without increasing or decreasing the back pressure in the exhaust pipe thereby enabling the air injection attachment to be used in conjunction with a combustion engine without necessitating that adjustments and/or revisions be made to the combustion engine in order to maintain its maximum efficiency.

Still another object of this invention is to provide an air injection attachment including a blower assembly provided with means adapted to be drivingly connected to an output shaft of the combustion engine with which it is associated.

Yet another object of this invention is to provide a fresh air injection attachment in accordance with the preceding objects which will not necessitate the removal of the conventional thermostatically controlled exhaust damper which is provided on substantially all vehicle internal combustion engines to assist in warming up the internal combustion engine rapidly by increasing the back pressure in the exhaust manifold during the warmup period.

A further object of this invention is to provide a fresh air injection attachment which may be readily incorporated into existing exhaust systems.

A final object to be specifically enumerated herein is to provide a fresh air injection attachment for the exhaust pipe of a combustion engine in accordance with the preceding objects which will conform to conventional forms of manufacture, be of simple construction and easy to install so as to provide a device that will be economically feasible, long lasting and readily adaptable to existing motor vehicle internal combustion engines.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
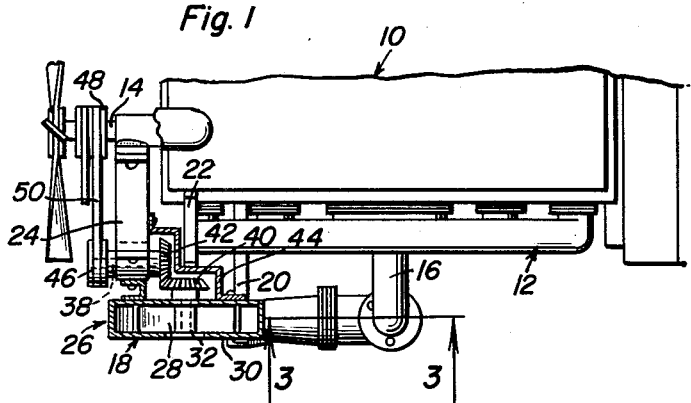
FIGURE 1 is a fragmentary top plan view of an internal combustion engine with the fresh air injection attachment of the instant invention secured to the exhaust pipe of the combustion engine and drivingly connected to an output shaft of the combustion engine, parts of the fresh air injection attachment being broken away and shown in section.
Figure 2:
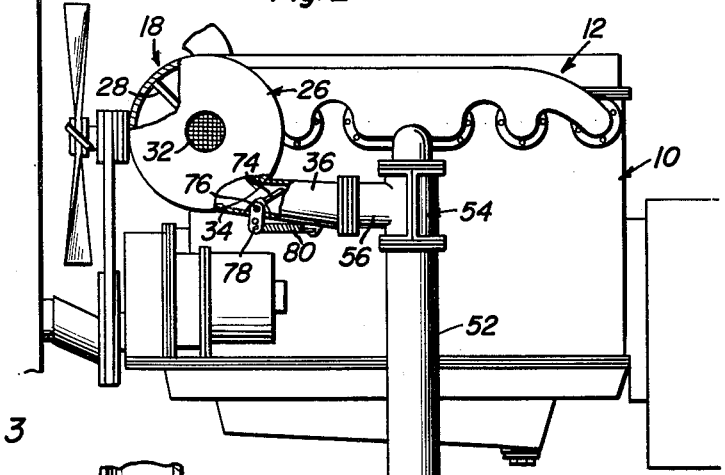
FIGURE 2 is a fragmentary side elevational view of the embodiment illustrated in FIGURE 1, parts of the attachment being broken away and shown in section.

Referring now more specifically to the drawings, the numeral 10 generally designates an internal combustion engine which is provided with an exhaust manifold generally referred to by the reference numeral 12 and an output shaft 14.

The exhaust manifold 12 includes an outlet neck 16 and the fresh air injection attachment of the instant invention is generally designated by the reference numeral 18 and is mounted alongside the engine 12 by means of suitable brackets 20 and 22. Additional brackets such as bracket 24 may also be provided if desired.

The attachment 18 includes a blower assembly generally referred to by the reference numeral 26 which includes a blower rotor 28 rotatably mounted in a blower housing 30 which is provided with an air inlet 32. The housing 30 includes an air outlet 34 and an outlet nozzle 36. The rotor 28 is drivingly connected to an input shaft 38 by means of bevel gears 40 and 42 which are disposed in a transmission housing 44 secured to the blower housing 30 and the input shaft 38 is provided with a pulley 46 which is drivingly connected to a pulley 48 carried by the output shaft 14 by means of an endless flexible belt 50. Accordingly, upon rotation of the output shaft 14, the blower rotor 28 will be rotated at high speed in order to draw fresh air through the air inlet 32 and exhaust the fresh air under pressure through the air outlet 34 and into the outlet neck 36.

Figure 3:
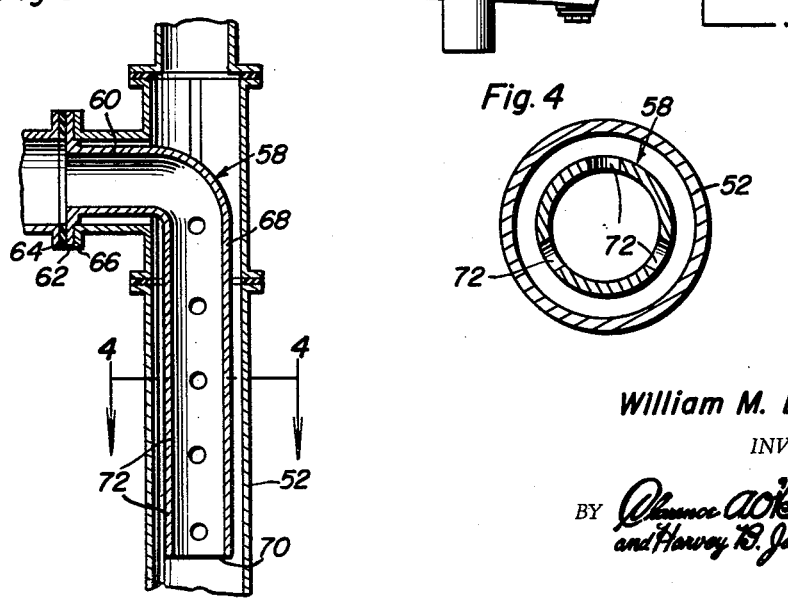
FIGURE 3 is an enlarged fragmentary vertical sectional view taken substantially upon the plane indicated by the section line 3—3 of FIGURE 1.
Figure 4:
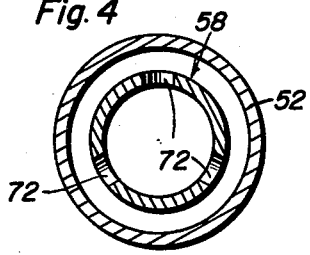
FIGURE 4 is an enlarged horizontal sectional view taken substantially upon the plane indicated by the section line 4—4 of FIGURE 3.

The internal combustion engine 10 has an exhaust pipe 52 normally connected to the outlet neck 16 of the exhaust manifold 12 but the attachment 18 includes a T-fitting generally referred to by the reference numeral 54 which is disposed between the inlet end of the exhaust pipe 52 and the outlet end of the outlet neck 16. The outlet neck 36 is secured to the horizontal leg 56 of the T-fitting 54 and it may be observed from FIGURE 3 of the drawings that the attachment 18 also includes an L-shaped outlet conduit generally referred to by the reference numeral 58. The short horizontal leg 60 of the outlet conduit 58 is provided with a radial flange clampingly engaged between the confronting radial flanges 64 and 66 of the outlet neck 36 and the horizontal leg 56 of the T-fitting 54, and the vertical longer leg 68 of the outlet conduit 58 extends longitudinally of the lower end of the T-fitting 54 and the inlet end of the exhaust pipe 52. The free end of the vertical leg 68 is open as at 70 and the vertical leg 68 of the outlet conduit 58 is provided with a plurality of radial openings 72 which are circumferentially spaced about the vertical leg 68 and are spaced longitudinally thereof.

The outlet neck 36 also includes a gate valve member 74 which comprises a check valve and is swingably mounted as at 76 within the outlet neck 36 for movement about an axis extending transversely of the outlet neck 36. A lever arm 78 is connected to the gate valve member 74 and is normally urged toward a position closing the gate valve member 74 by means of an expansion spring 80 whose opposite ends are secured between the free end of the lever 78 and the outlet neck 36. When the gate valve member 74 is swung to the closed position, it is extending transversely of the outlet neck 36.

In operation, as the internal combustion engine 10 is operated, the output shaft 14 rotates which in turn rotates the rotor 28. Air is pulled in through the air inlet 32 and is exhausted through the outlet neck 36. Some of the air discharged through the outlet neck 36 continues completely through the outlet conduit 58 and egresses from the free end of the vertical leg 68 thereof as at 70. However, portions of the fresh air under pressure within the outlet conduit 58 egress through the openings 72. By discharging some of the fresh air under pressure through the openings 72, the jet effect of portions of the fresh air being discharged from the open end of the vertical leg 68 which would have a tendency to reduce the back pressure within the exhaust manifold 12 is offset. Accordingly, although large quantities of fresh air are injected into the exahust pipe 52 under pressure, the back pressure within the exhaust manifold 12 is maintained substantially constant at all times relative to the normal back pressure within the exhaust manifold 12.

The diameter of the outlet conduit 58 and thus the obstruction effected in the exhaust pipe 52 caused thereby, the capacity of the blower assembly 26 and the diameter of the openings 72 will be predetermined for a given internal combustion engine.

Thus it may be seen that the attachment 18 will deliver large quantities of fresh air under pressure to the exhaust pipe 52 in a manner whereby the normal back pressure of the exhaust gases in the exhaust manifold 12 is unaltered. The check valve defined by the gate valve member 74 is utilized to prevent higher pressure exhaust gases within the exhaust pipe 52 from backing up through the outlet conduit 58 and into the blower assembly 26 when the engine is operating under heavy loads at slow speed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, failing within the scope of the invention as claimed.

What is claimed as new is as follows:

1. In combination, a combustion engine having an exhaust manifold attached to an end of an exhaust pipe by a T-fitting and an engine cooling fan connected to a power driven output shaft, an attachment for injecting fresh air under pressure into said exhaust pipe without increasing or decreasing the back pressure of exhaust gases in said exhaust pipe, said attachment comprising a blower having an input shaft drivingly connected by a belt to said fan output shaft, an air inlet extending horizontally and connected to one side of said T-fitting and to said blower, an air outlet conduit connected to said air inlet, said air outlet conduit including a free end portion disposed within said T-fitting and the upper end of said exhaust pipe directly adjacent said manifold, said outlet conduit extending longitudinally thereof downwardly in said exhaust pipe away from said manifold in the direction of movement of exhaust gases through said exhaust pipe and in spaced relation relative to the internal surfaces of said exhaust pipe, the free terminal end of said outlet conduit being open and said free end portion including passage means for discharging some of the compressed air discharged through said outlet conduit radially and outwardly of said free end portion whereby large amounts of fresh air under pressure may be introduced by said blower into said exhaust pipe without increasing or decreasing the back pressure in said exhaust pipe.

2. In the combination of claim 1 a valve in said air inlet, said valve including a gate valve member swingably mounted at one edge for movement about an axis extending transversely of said air inlet and between a closed position extending transversely of said air inlet conduit and an open position with the free edge of said gate valve member extending toward said T-fitting, spring means yieldably urging said gate valve member toward said closed position.

3. The combination of claim 1 wherein said discharging means comprises a plurality of circumferentially and axially spaced openings formed in said free end portion, a check valve disposed in said air outlet conduit for preventing reverse flow of gases therethrough from said exhaust pipe and into said blower, said valve including a gate valve member swingably mounted at one edge for movement about an axis extending transversely of said outlet conduit and between a closed position extending transversely of said outlet conduit and an open position with the free edge of said gate valve member extending toward said T-fitting, spring means yieldably urging said gate valve member toward said closed position.

4. In combination, an internal combustion engine, a horizontally extending manifold connected to one side of the engine and an exhaust pipe, a T-fitting comprising a vertical tube having open ends and a horizontal tube having one open end and another end connected to said vertical tube between its ends, the upper end of said vertical tube connected to the center of said manifold, the lower end of said vertical tube connected to a vertically extending end portion of the exhaust pipe, an air blower operatively connected to and driven by said engine, an air supply conduit connecting the outlet of said blower to the open end of said horizontal tube, an L-shaped air conduit comprising a horizontal portion and a vertical portion connected at adjacent ends, the other ends of said portions being open, the open end of said horizontal portion being provided with an integral radially extending annular flange clamped between the open end of said horizontal tube and one end of the air supply conduit, said horizontal portion extending through said horizontal tube into said vertical tube, said vertical portion extending downwardly into the vertical end portion of the exhaust pipe and provided with a plurality of circumferentially and axially spaced bores, annular spaces being provided between said vertical portion and said vertical tube and said vertical end portion of the exhaust pipe.

References Cited in the file of this patent

UNITED STATES PATENTS

| 1,843,999 | White | Feb. 9, 1932 |
| 2,649,685 | Cohen | Aug. 25, 1953 |

FOREIGN PATENTS

| 435,780 | Great Britain | Sept. 27, 1935 |